(12) United States Patent
Yeh et al.

(10) Patent No.: US 8,306,584 B2
(45) Date of Patent: Nov. 6, 2012

(54) PORTABLE ELECTRONIC DEVICE

(75) Inventors: Chih-Shan Yeh, Taoyuan County (TW);
Ching-Shih Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 602 days.

(21) Appl. No.: 12/419,279

(22) Filed: Apr. 6, 2009

(65) Prior Publication Data

US 2010/0087232 A1    Apr. 8, 2010

(30) Foreign Application Priority Data

Oct. 8, 2008  (TW) ................................ 97138719 A

(51) Int. Cl.
*H04M 1/00* (2006.01)
(52) U.S. Cl. .................. 455/575.4; 455/575.3
(58) Field of Classification Search ............... 455/575.4, 455/575.3
See application file for complete search history.

(56) References Cited

U.S. PATENT DOCUMENTS

| | | | |
|---|---|---|---|
| 5,494,447 A | | 2/1996 | Zaidan |
| 7,556,315 B2* | | 7/2009 | Nathan et al. ............ 297/378.12 |
| 2007/0243896 A1* | | 10/2007 | Maatta et al. ............... 455/550.1 |
| 2009/0156264 A1* | | 6/2009 | Cho et al. ........................ 455/566 |
| 2009/0163257 A1* | | 6/2009 | Vesamaki et al. .......... 455/575.4 |
| 2009/0170574 A1* | | 7/2009 | Harmon et al. ............ 455/575.4 |
| 2009/0232299 A1* | | 9/2009 | Demuynck et al. ....... 379/433.12 |
| 2009/0264167 A1* | | 10/2009 | Shi et al. ..................... 455/575.4 |
| 2009/0286574 A1* | | 11/2009 | Kim et al. ...................... 455/566 |
| 2009/0305755 A1* | | 12/2009 | Lee et al. .................... 455/575.4 |
| 2010/0004027 A1* | | 1/2010 | Jang et al. ...................... 455/566 |
| 2010/0144408 A1* | | 6/2010 | Chuang et al. ............. 455/575.4 |
| 2010/0184492 A1* | | 7/2010 | Kim et al. .................. 455/575.4 |

FOREIGN PATENT DOCUMENTS

| | | |
|---|---|---|
| CN | 101378419 | 3/2009 |
| EP | 1217501 | 6/2002 |
| TW | 200911085 | 3/2009 |
| WO | 2006106374 | 10/2006 |

OTHER PUBLICATIONS

"Search Report of European counterpart application", issued on Jan. 15, 2010, p. 1-p. 6.
"First Office Action of China Counterpart Application", issued on Jan. 6, 2011, p. 1-p. 3, in which the listed reference was cited.
"Office Action of Taiwan Counterpart Application", issued on Jul. 13, 2011, p. 1-p. 5, in which the listed reference was cited.
"Office Action of Taiwan Counterpart Application", issued on Nov. 30, 2011, p. 1-p. 6, in which the listed references were cited.

* cited by examiner

*Primary Examiner* — Linh Nguyen
(74) *Attorney, Agent, or Firm* — Jianq Chyun IP Office

(57) ABSTRACT

A portable electronic device having a first body, a second body, and a moving mechanism is provided. The moving mechanism is disposed between the first body and the second body such that the second body is moveable between a first position and a second position. In the first position, the second body is stacked on the first body. In the second position, top surfaces of the first body and second body are substantially coplanar.

10 Claims, 21 Drawing Sheets

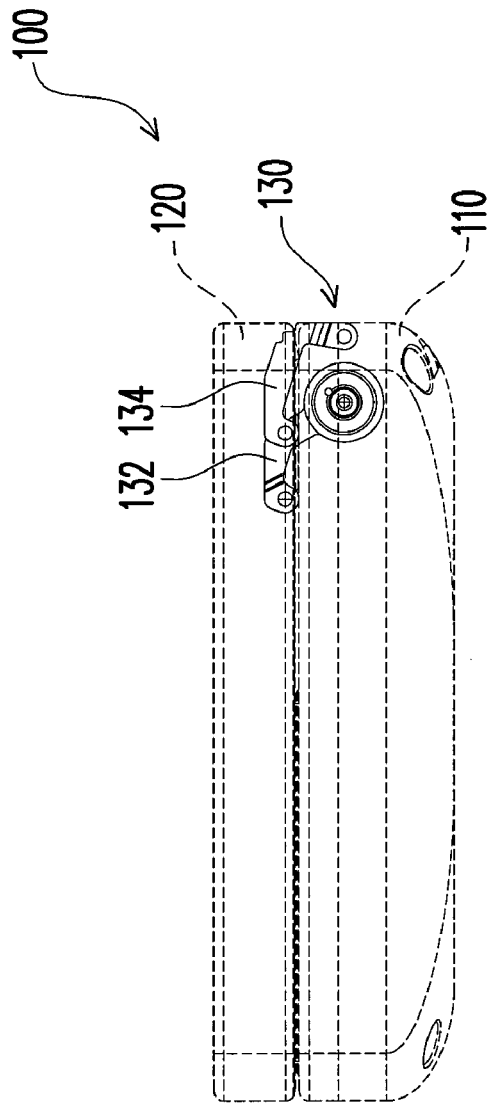
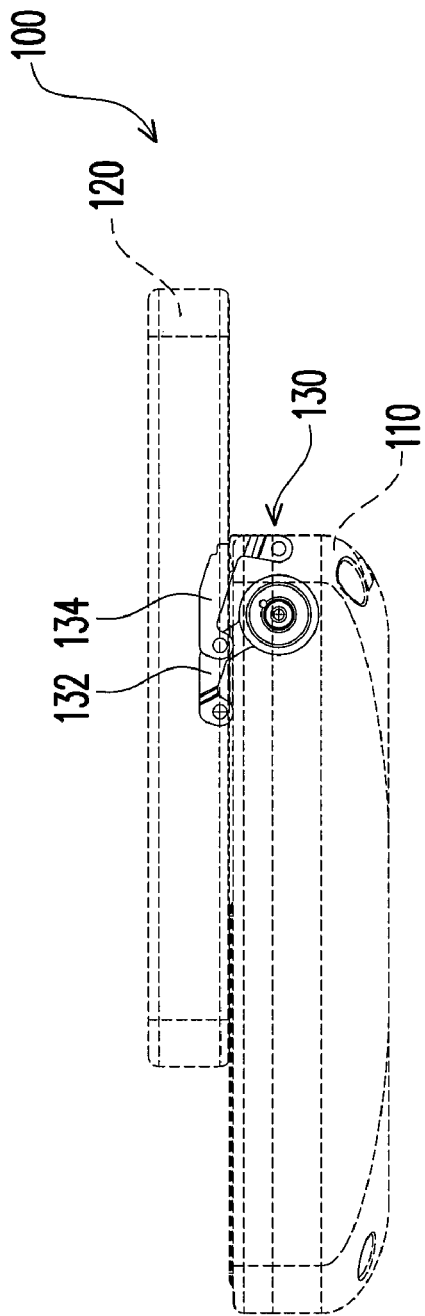

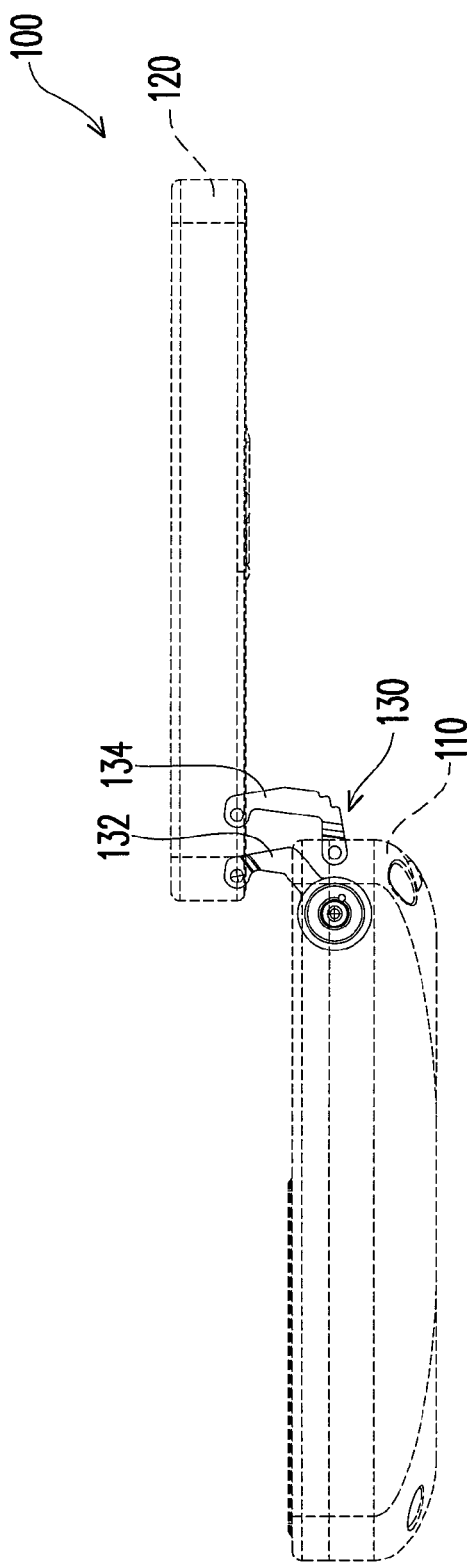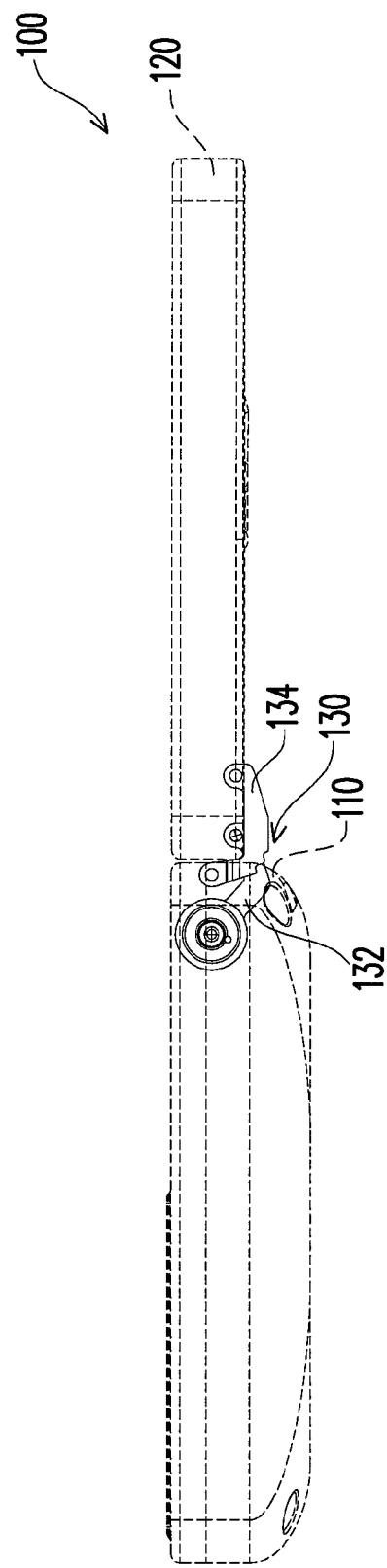

PORTABLE ELECTRONIC DEVICE

CROSS-REFERENCE TO RELATED APPLICATION

This application claims the priority benefit of Taiwan application serial no. 97138719, filed on Oct. 8, 2008. The entirety of the above-mentioned patent application is hereby incorporated by reference herein and made a part of specification.

BACKGROUND OF THE INVENTION

1. Field of the Invention

The present application generally relates to a portable electronic device, in particular, to a portable electronic device having two bodies capable of being stacked or spread.

2. Description of Related Art

Portable electronic devices refer to electronic devices capable of being carried and operated by users. Portable electronic devices generally have small volume and weight for being carried by users conveniently. Common portable electronic devices include mobile phones, multimedia players, personal digital assistants, handheld game consoles, handheld satellite navigation systems, and notebook computers.

Most of the current portable electronic devices adopt a two-layer folding or sliding design, thus the two bodies of the portable electronic device have a minimum volume when being stacked and a large area when being spread. However, as for sliding design, the two bodies are still partially stacked when sliding with respect to each other, thus definitely reducing the area utilization rate of the lower body.

SUMMARY OF THE INVENTION

Accordingly, the present application is directed to a portable electronic device having a function of stacking or spreading bodies thereof.

The present application provides a portable electronic device having a first body, a second body, and a moving mechanism. The moving mechanism is disposed between the first body and second body, such that the second body is moveable between a first position and a second position with respect to the first body. In the first position, the second body is stacked on the first body. In the second position, top surfaces of the first body and the second body are substantially coplanar.

Based on the above description, the present application stacks or spreads the two bodies via the sliding mechanism and the moving mechanism, so as to improve the area utilization rate of the first body.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A to 1F show a process of spreading a portable electronic device according to an embodiment of the present invention.

DESCRIPTION OF THE EMBODIMENTS

Figure 1C:
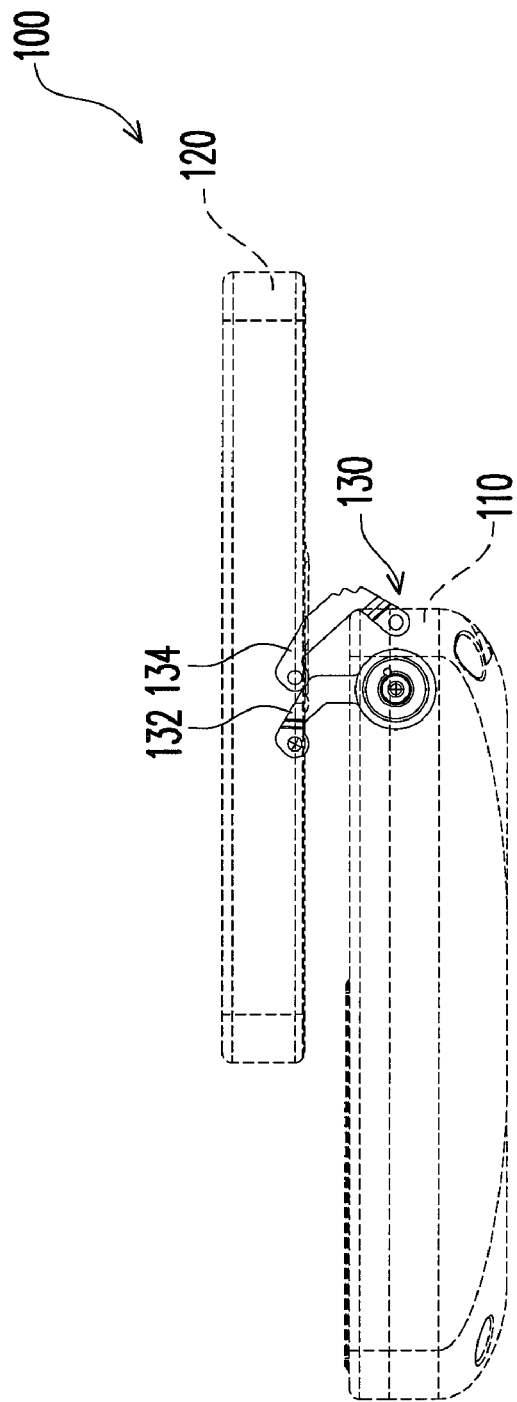

Reference will now be made in detail to the present embodiments of the invention, examples of which are illustrated in the accompanying drawings. Wherever possible, the same reference numbers are used in the drawings and the description to refer to the same or like parts.

FIGS. 1A to 1F show a process of spreading a portable electronic device according to an embodiment of the present invention. Referring to FIGS. 1B to 1F, a portable electronic device 100 of this embodiment includes a first body 110, a second body 120, and a moving mechanism 130. In order to facilitate the representation by figures, in FIGS. 1A to 1F, the first body 110 and the second body 120 are represented by broken lines, and some components are hidden. The moving mechanism 130 is disposed between the first body 110 and the second body 120, such that the second body 120 is moveable between a first position in FIG. 1B and a second position in FIG. 1F with respect to the first body 110.

During the movement of the second body 120 between the first position in FIG. 1B and the second position in FIG. 1F, the second body 120 is kept substantially horizontal with respect to the first body 110. That is to say, during the movement, the normal vectors of the upper surfaces of the first body 110 and the second body 120 are substantially kept parallel to each other. In other words, during the movement, the width directions (or the length directions) of the first body 110 and the second body 120 are substantially kept parallel to each other.

When the second body 120 is in the second position in FIG. 1F, the second body 120 is laterally close to first body 110, that is, one edge of the second body 120 is close to one edge of the first body 110. Therefore, the first body 110 can have a great area utilization rate.

In this embodiment, the moving mechanism 130 includes a rotating arm 132 and a parallel arm 134. Two ends of the rotating arm 132 are pivoted to the first body 110 and the second body 120 respectively, and two ends of the parallel arm 134 are pivoted to the first body 110 and the second body 120 respectively.

When a distance between rotation axes of the rotating arm 132 and the parallel arm 134 pivoted to the second body 120 is substantially equal to a distance between rotation axes of the rotating arm 132 and the parallel arm 134 pivoted to the first body 110. That is, a parallelogram is substantially formed. Therefore, during the movement of the second body 120 between the first position in FIG. 1B and the second position in FIG. 1F, the second body 120 is kept substantially horizontal with respect to first body 110.

Figure 1D:
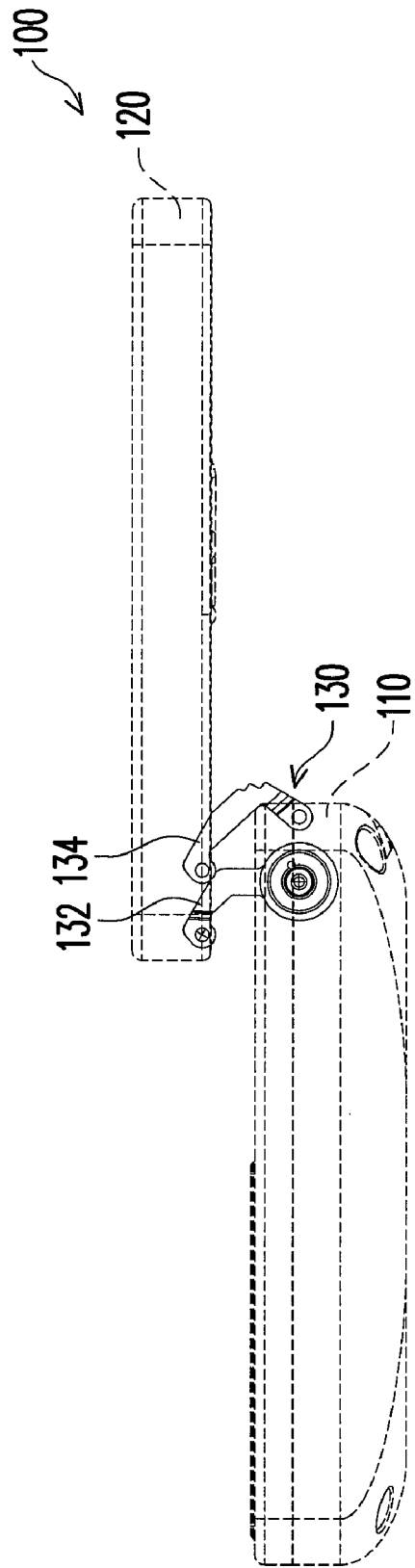
Figure 2A:
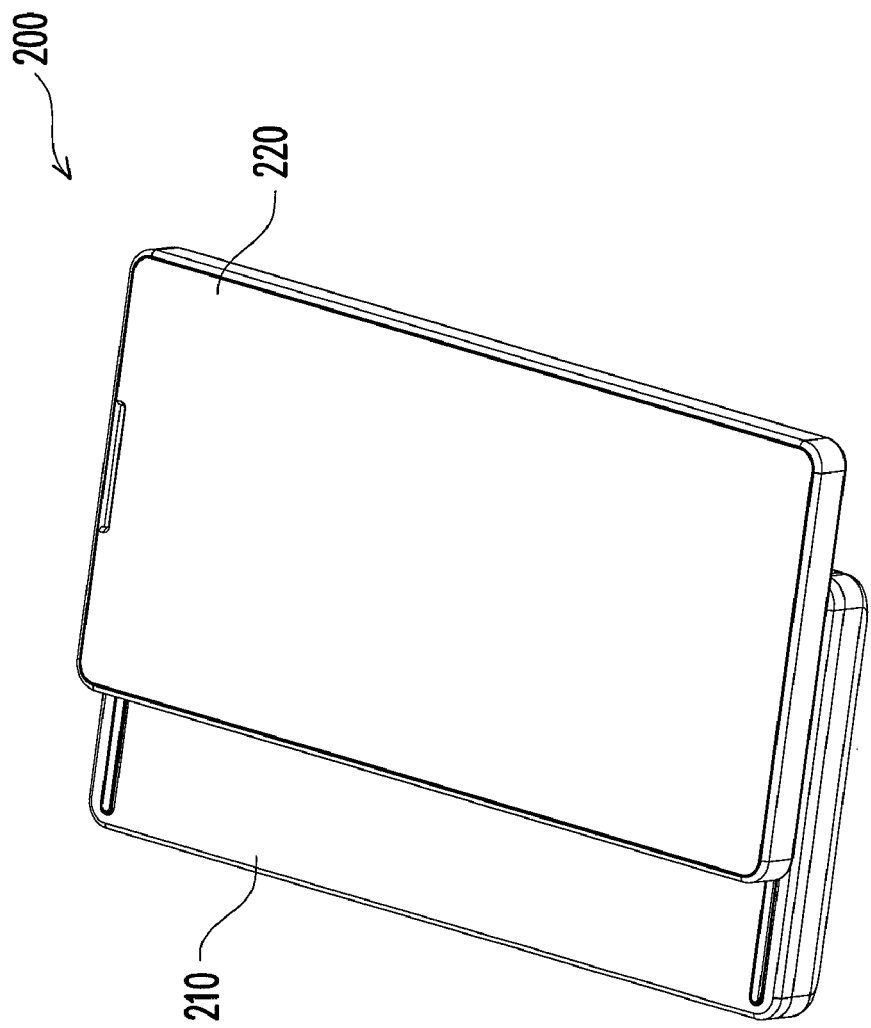
FIGS. 2A to 2F are exploded views of a number of components of a portable electronic device according to another embodiment of the present invention respectively.
Figure 2B:
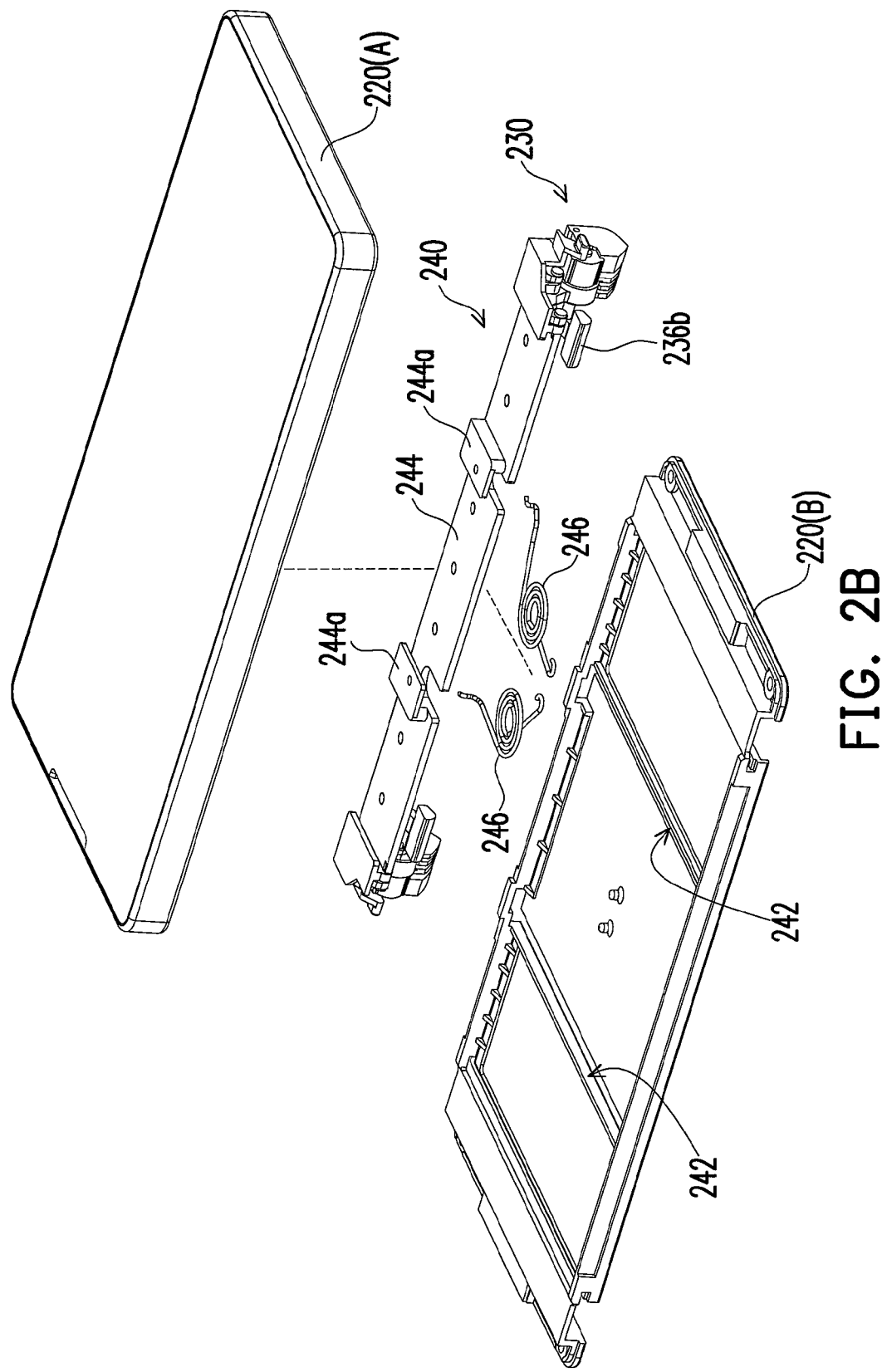

In this embodiment, the portable electronic device 100 further includes a sliding mechanism (similar to the reference number 240 as shown in FIG. 2B), disposed between the moving mechanism 130 and the second body 120, such that the second body 120 is moveable between a first sliding position FIG. 1A and a second sliding position in FIG. 1D with respect to the moving mechanism 130. More particularly, one ends of the rotating arm 132 and the parallel arm 134 of the moving mechanism 130 are able to be slid with respect to the second body 120, that is, a movement similar to that of a common sliding hinge. However, it should be noted that, the slide of the second body 120 with respect to the first body 110 includes two stages, in which the first stage slide occurs from FIG. 1A to FIG. 1B, and the second stage slide occurs from FIG. 1C to FIG. 1D. Further, in this embodiment, the user must push the second body 120 to generate the two-stage slide, that is, the portable electronic device 100 does not have the semi-auto sliding function or auto sliding function. However, the portable electronic device having the semi-auto sliding function will be described hereinafter in detail. Next, the sliding mechanism that is not shown in this embodiment will be exemplified in the following embodiments.

FIGS. 2A to 2F are exploded views of a number of components of a portable electronic device according to another embodiment of the present invention respectively. Referring to FIGS. 2A and 2B, a portable electronic device 200 of this embodiment includes a first body 210 and a second body 220. In this embodiment, the second body 220 includes a part A and a part B assembled to the part A, as shown in FIG. 2B. Further, the part A can be an upper cover.

Figure 2C:
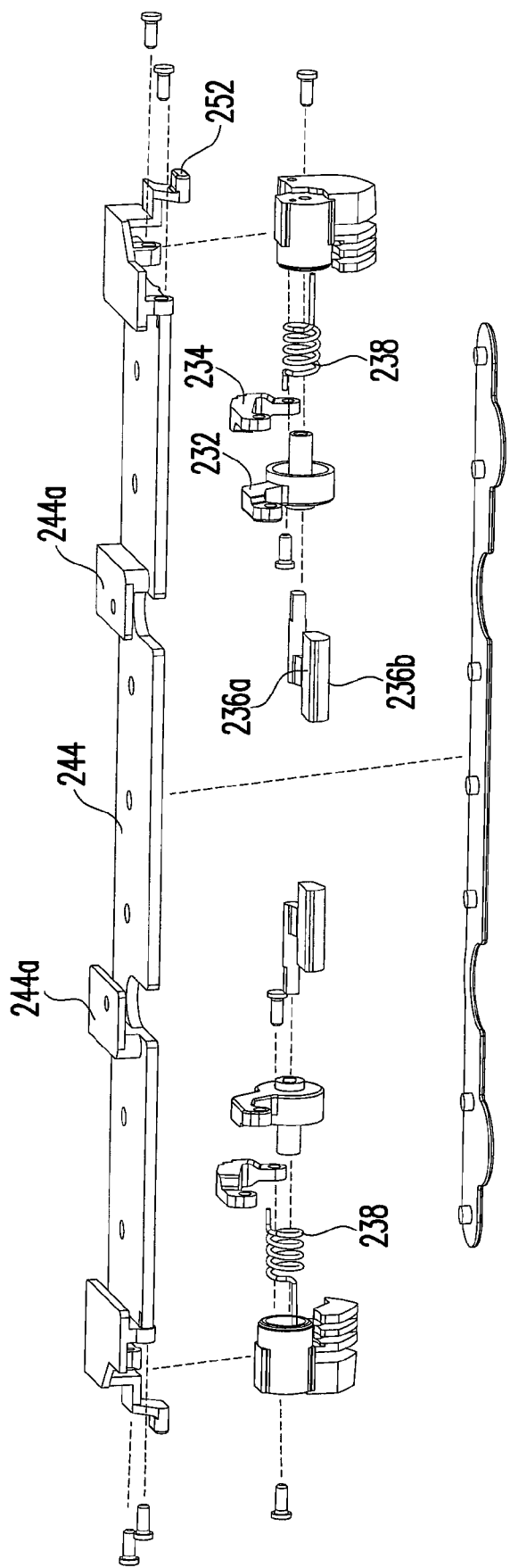

Referring to FIGS. 2B and 2C, the portable electronic device 200 further includes a moving mechanism 230, having components and functions similar to those of the moving mechanism 130 in FIG. 1A. In this embodiment, the moving mechanism 230 includes two rotating arms 232 and two parallel arms 234, and the connection relationships of the two rotating arms 232 and the two parallel arms 234 between the first body 210 and the second body 220 are similar to those of the rotating arm 132 and the parallel arm 134 in FIG. 1A between the first body 110 and the second body 120.

Referring to FIG. 2B next, the portable electronic device 200 further includes a sliding mechanism 240. In this embodiment, the sliding mechanism 240 includes a plurality of slide rails 242 and a base 244. The slide rails 242 are disposed on the part B substantially in parallel. The base 244 has a plurality of sliding blocks 244a coupled to the slide rails 242 respectively for sliding along the slide rails 242. More particularly, the sliding blocks 244a pass through the slide rails 242 respectively, and the base 244 is located below the second body 220.

In this embodiment, the sliding mechanism 240 further includes a pair of torsion springs 246 disposed between the part B of the second body 220 and the base 244. Therefore, when the user pushes the second body 120 between the first position and the second position with respect to the base 244, the semi-auto sliding function of the sliding mechanism 240 is generated by means of one of the torsion springs 246.

Figure 2D:
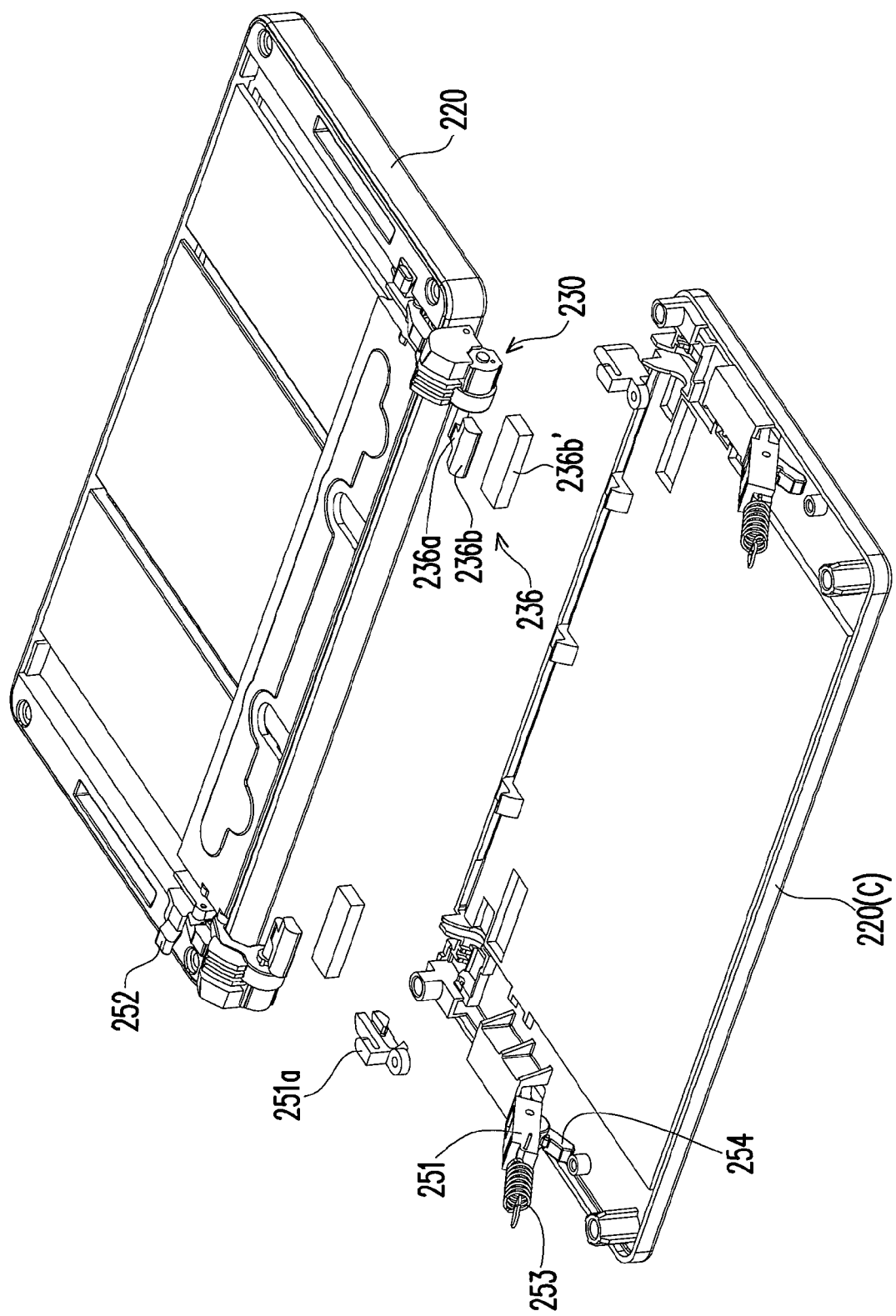

Referring to FIG. 2D, the first body 210 includes a part C. After the moving mechanism 230 is connected to the sliding mechanism 240, the moving mechanism 230 is connected to the part C. Further, the part C is, for example, a part of a key board. In order to facilitate the description, the arrangement of the components in FIGS. 2B and 2D are in reverse order for illustrating the structure in detail.

Figure 2E:
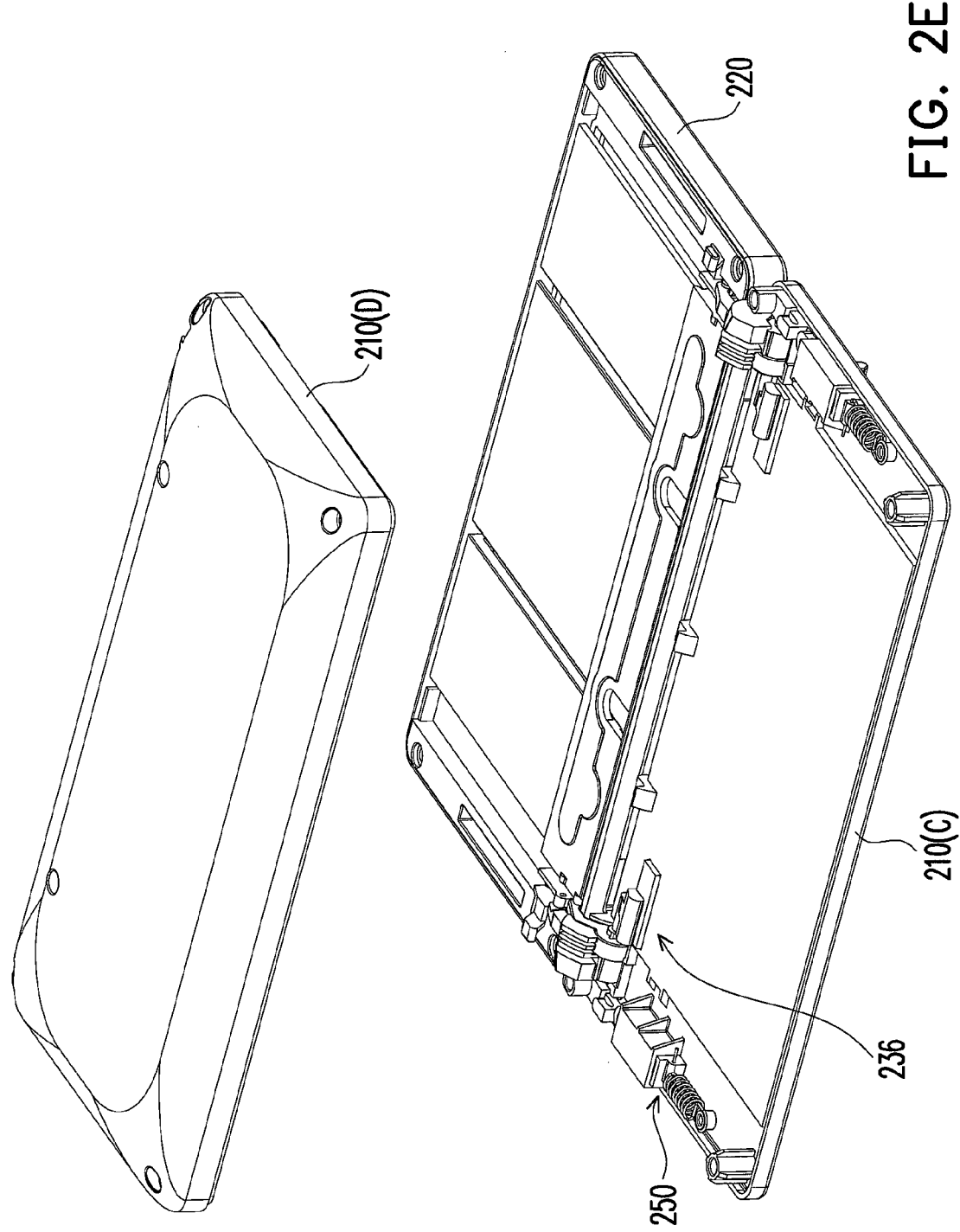

Referring to FIG. 2E, the first body 210 further includes a part D. After the moving mechanism is connected to the part C, the part D is assembled to the part C. Further, the part D is, for example, a back cover.

Figure 2F:
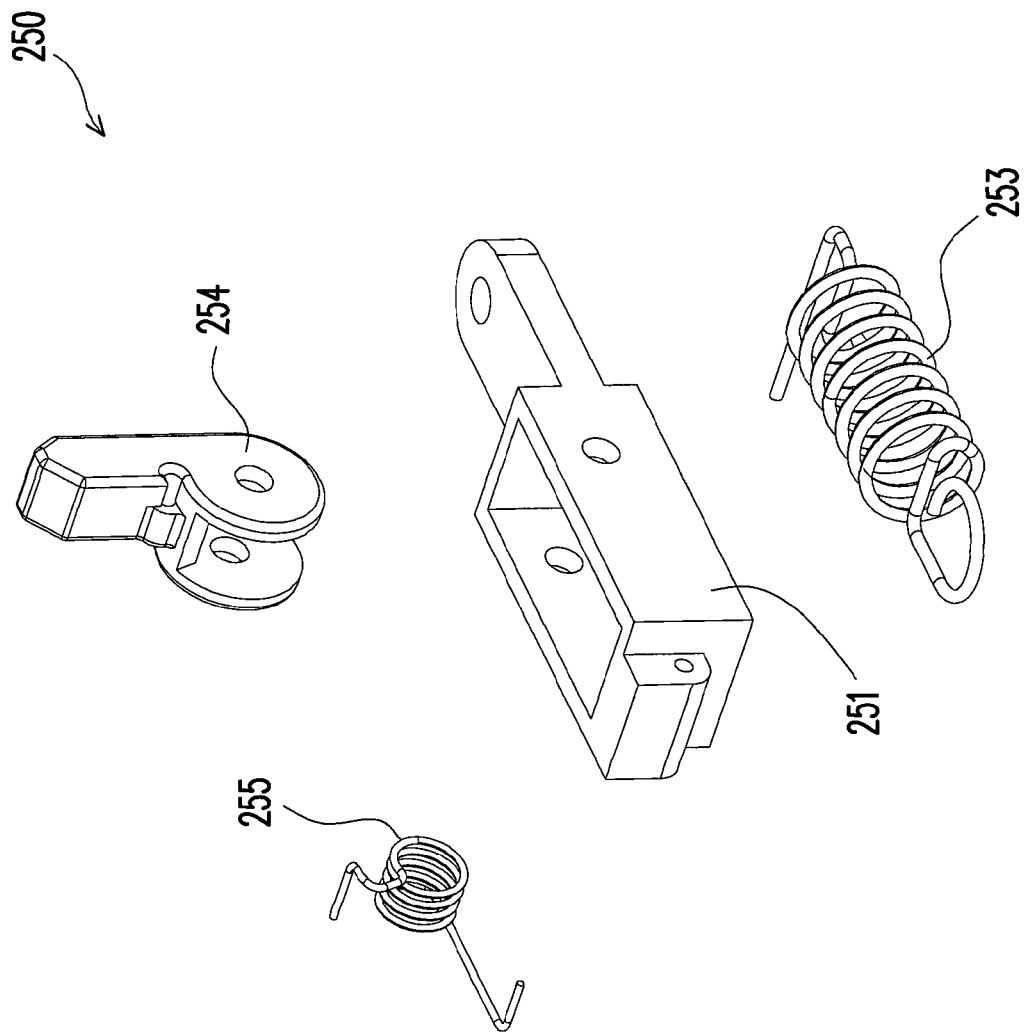

Referring to FIG. 2F, the portable electronic device 200 further includes a braking mechanism 250, and most of the components thereof are also represented in FIG. 2F in an exploded manner.

Figure 3A:
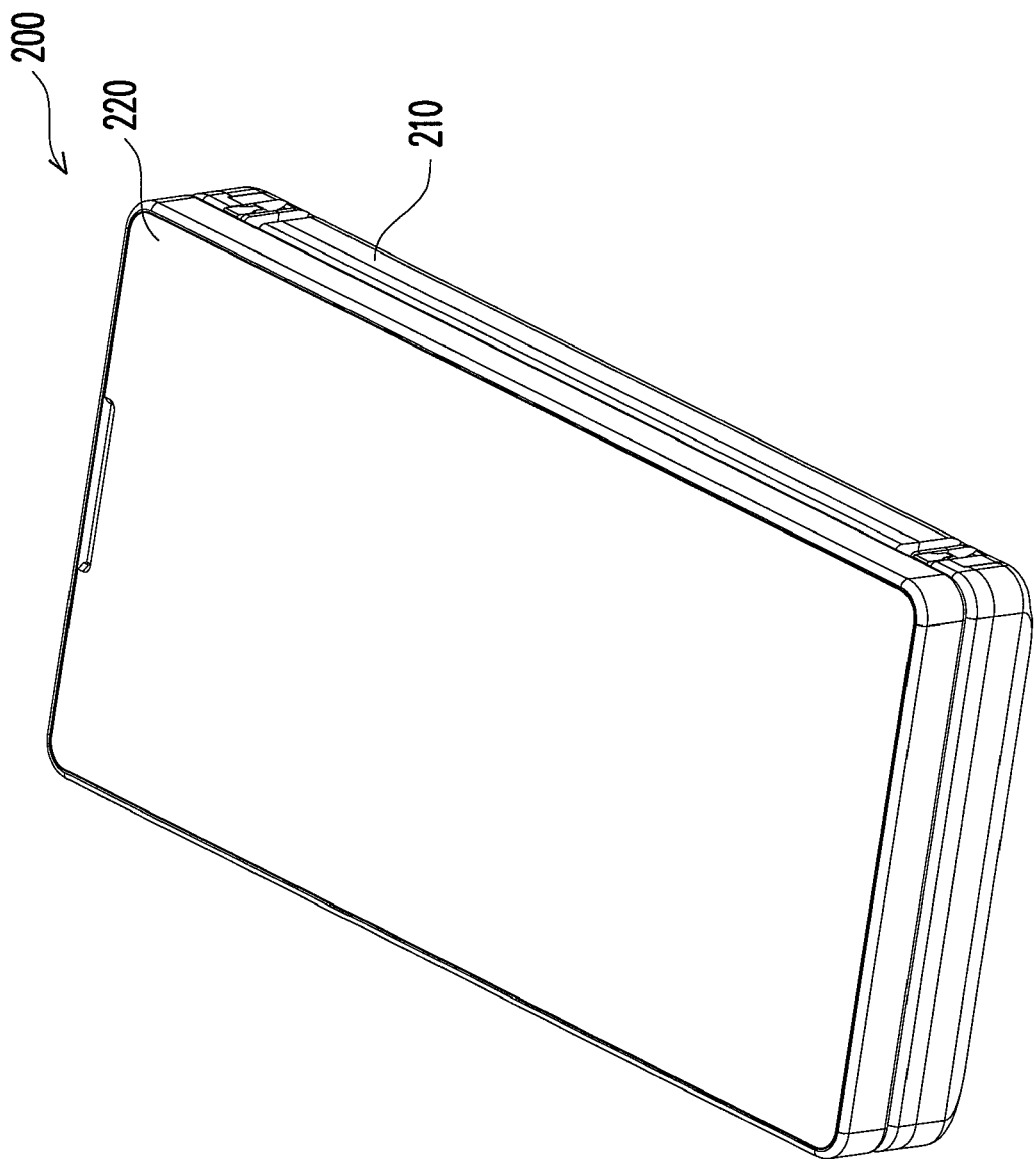
FIGS. 3A to 3F show a process of spreading the portable electronic device in FIG. 2A.
Figure 3B:
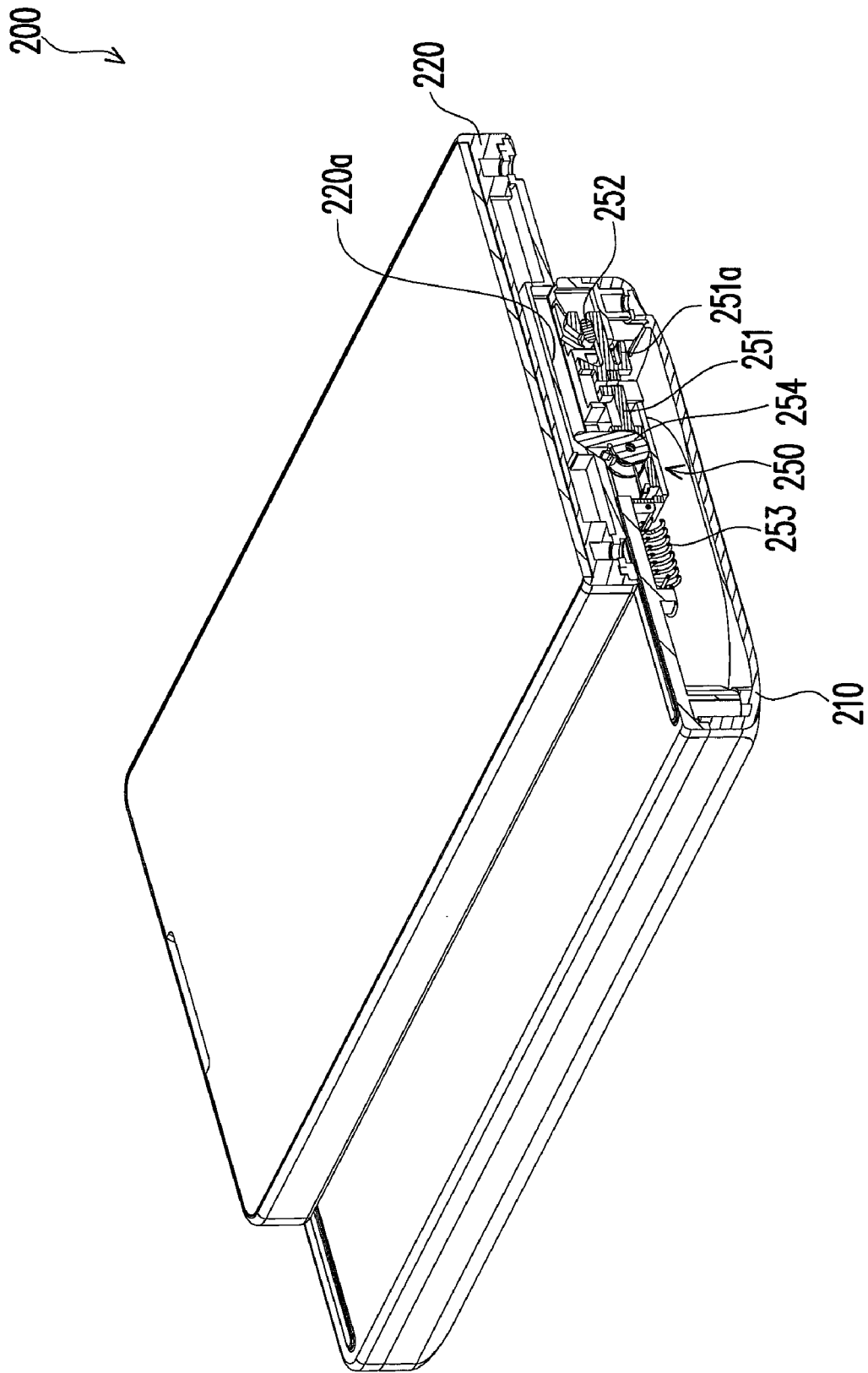

FIGS. 3A to 3F show a process of spreading the portable electronic device in FIG. 2A. Referring to FIGS. 3A and 3B, the second body 220 is capable of sliding from a first sliding position in FIG. 3A to a second sliding position in FIG. 3E with respect to the first body 210 by means of the sliding mechanism 240 in FIG. 2B. It should be noted that, the slide of the second body 220 with respect to the first body 210 also includes two stages, in which the first stage slide occurs from FIG. 3A to FIG. 3B, and the second stage slide occurs from FIG. 3C to FIG. 3D.

Referring to FIGS. 2E and 3B, the braking mechanism 250 is disposed on the first body 210 for changing the moving mechanism 230 from a disabled state into an enabled state corresponding to the movement of the second body 220 with respect to the first body 210.

Referring to FIGS. 2E, 2F, and 3B, the braking mechanism 250 includes a braking base 251 slidably disposed in first body 210 and having a guide rail 251a (as shown in FIG. 3B). In this embodiment, the guide rail 251a is fabricated independent from the braking base 251.

The braking mechanism 250 further includes a guide block 252 fixed to the second body 220 and adapted to move in the guide rail 251a. In this embodiment, the guide block 252 is directly formed integrally with the base 244 of the sliding mechanism 240, as shown in FIG. 2C. The base 244 is fixed to the second body 220, i.e., fixed on the part B.

The braking mechanism 250 further includes a first elastic member 253 disposed between the braking base 251 and the first body 210. In this embodiment, the first elastic member 253 is a coil spring.

The braking mechanism 250 further includes a trigger 254 pivoted to the braking base 251, so as to be driven by the second body 220 to push the braking base 251, thus enabling the guide block 252 to move along the guide rail 251a, such that the guide block 252 is moved to the moving mechanism 230 with respect to the guide rail 251a and the moving mechanism 230 is changed from the disabled state into the enabled state. In this embodiment, the second body 220 has a groove 220a, and the second body 220 is capable of push the trigger 254 through an inner wall of the groove 220a.

The braking mechanism 250 further includes a second elastic member 255 disposed between the trigger 254 and the braking base 251, for resetting the trigger 254 to a position for being pushed by the groove 220a of the second body 220 again with respect to the braking base 251. In this embodiment, the second elastic member 255 is a torsion spring.

Figure 3C:
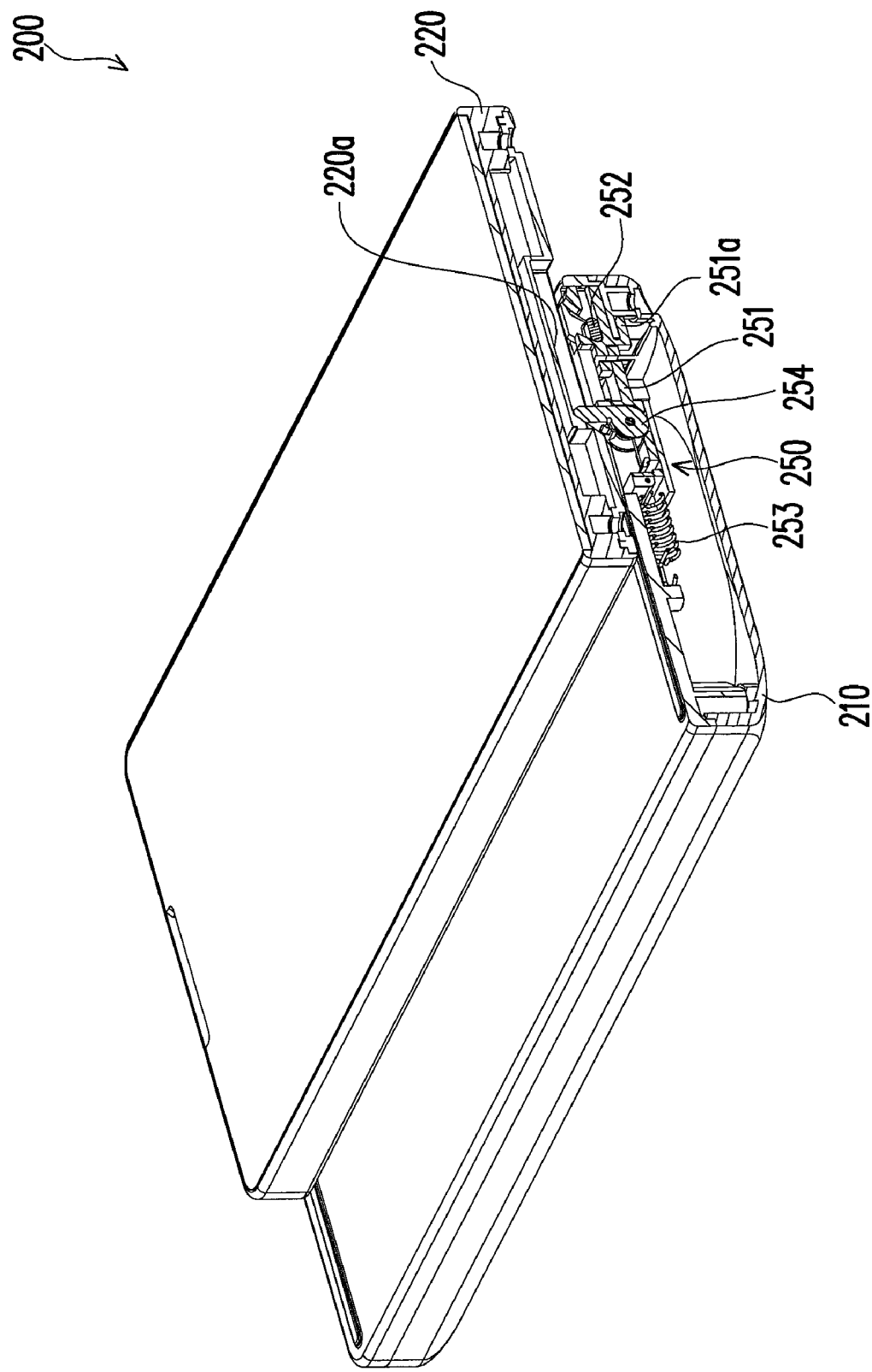

Referring to FIGS. 3B and 3C, when the guide block 252 slides from a position in FIG. 3B to a position in FIG. 3C with respect to the guide rail 251a, the guide block 252 may not be limited by the guide rail 251a any more, such that the moving mechanism 230 is changed from the disabled state into the enabled state. More particularly, the inner wall of the groove 220a of the second body 220 in FIG. 3B contacts the trigger 254, and the guide block 252 is located on a right side of the horizontal part of the guide rail 251a (as shown in FIG. 3B). When the second body 220 is continuously moved (as shown in FIG. 3C), the trigger 254 pushes the braking base 25 to drive the guide rail 251a, such that the position of the guide block 252 is moved to a left side of the horizontal part of the guide rail 251a (as shown in FIG. 3C). At the same time, the movement of the braking base 251 also draws the first elastic member 253.

Figure 3D:
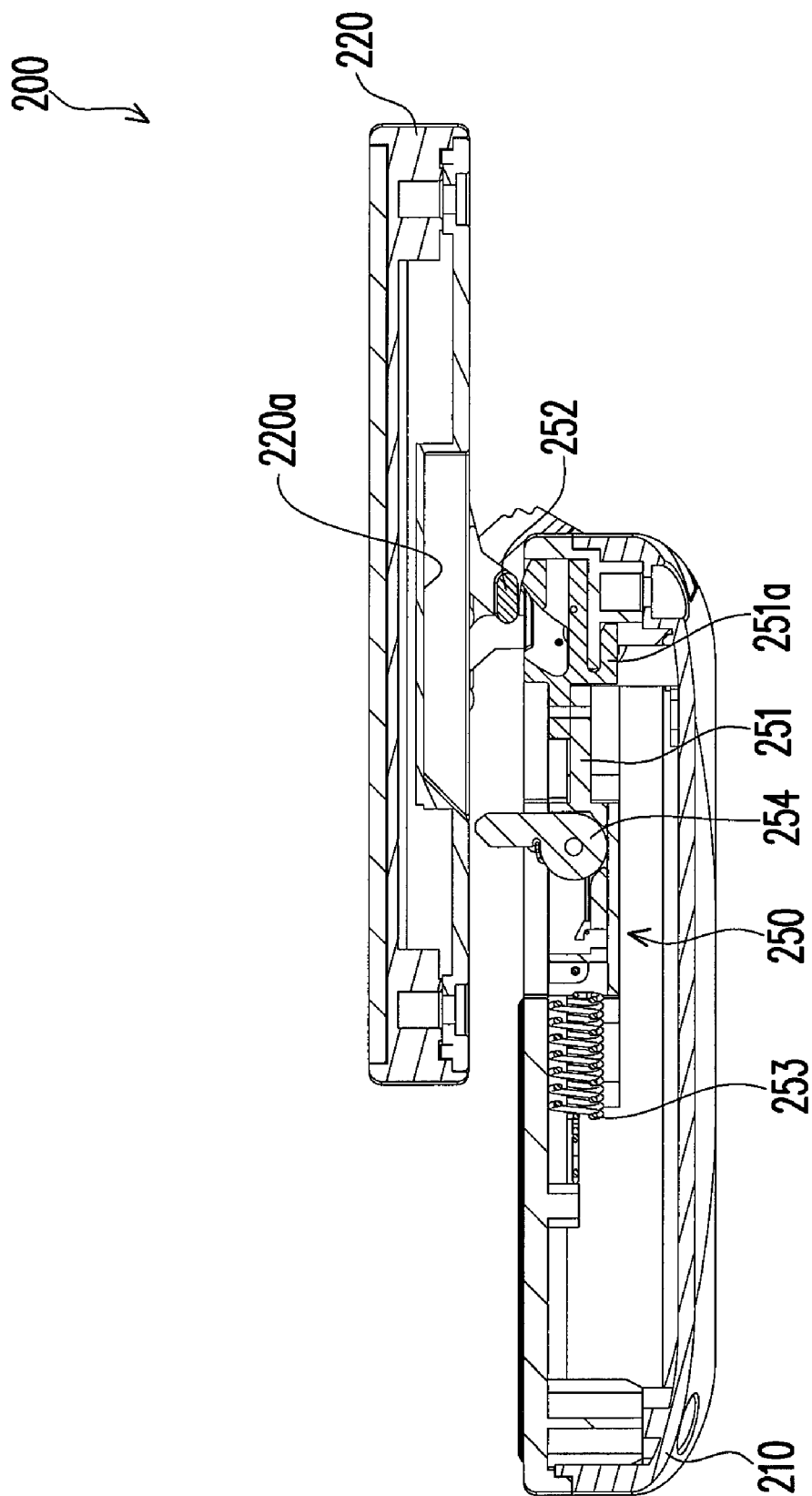

Referring to FIGS. 3C and 3D, when the moving mechanism 230 in FIG. 2B relatively moves the second body 220 from the position in FIG. 3C to the position in FIG. 3D, the second body 220 interferes with the first body 210 in structure. More particularly, as the moving mechanism 230 applies a torsion force on the rotating arm 232 and the parallel arm 234 via a torsion spring 238 (see FIG. 2C), when the guide block 252 is moved to a lifting part of the guide rail 251a, the moving mechanism 230 drives the second body 220 to rotate with respect to the first body 210. Simultaneously, the guide block 252 moves along the lifting part of the guide rail 251a for departing from the guide rail 251a.

Figure 3E:
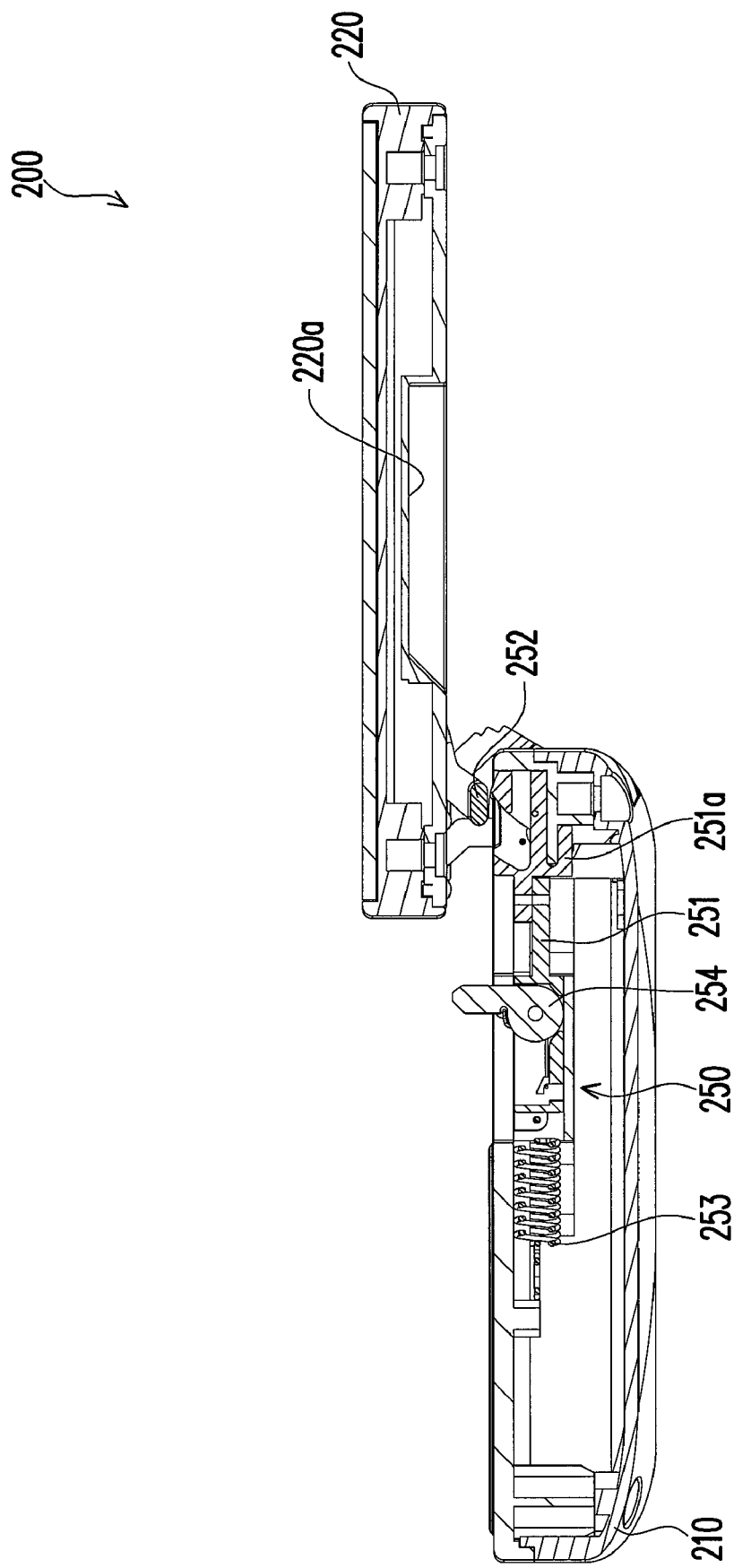

Referring to FIGS. 3D and 3E, in order to avoid the structural interference between the first body 210 and the second body 220, the second body 220 slides from the position in FIG. 3D to a position in FIG. 3E with respect to the first body 210 through the sliding mechanism 240.

Figure 3F:
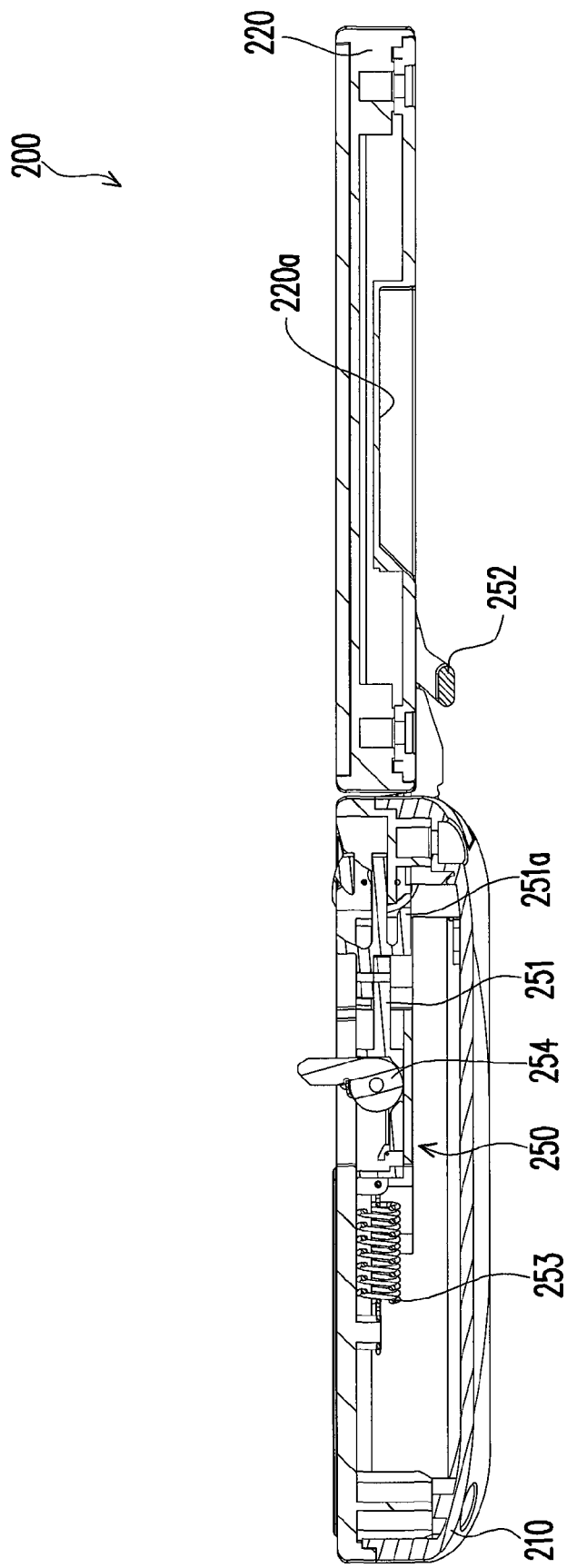

Referring to FIGS. 3E and 3F, during the movement of the second body 220 to a side of the first body 210 through the moving mechanism 230, when the guide block 252 is departed from the guide rail 251a, the first elastic member 253 resets the braking base 251 and the guide rail 251a with respect to the first body 210.

Referring to FIGS. 2C, 2D, and 2E, in this embodiment, the moving mechanism 230 further includes two fixing means 236 disposed between the first body 210 and the second body 220. Each fixing means 236 includes an auxiliary arm 236a, a first magnet 236b, and a second magnet 236b'. One ends of the auxiliary arms 236a are fixed to the rotating arms 232 respectively. The first magnets 236b are fixed to the other ends of the auxiliary arms 236a. The second magnets 236b' are fixed to the first body 210, for generating a magnetic force together with the first magnets 236b to limit the rotation of the auxiliary arms 236a with respect to the first body 210. More particularly, the first magnets 236b and the second magnets 236b' can be combined to limit the rotation or displacement of the second body 220 with respect to the first body 210.

Figure 4A:
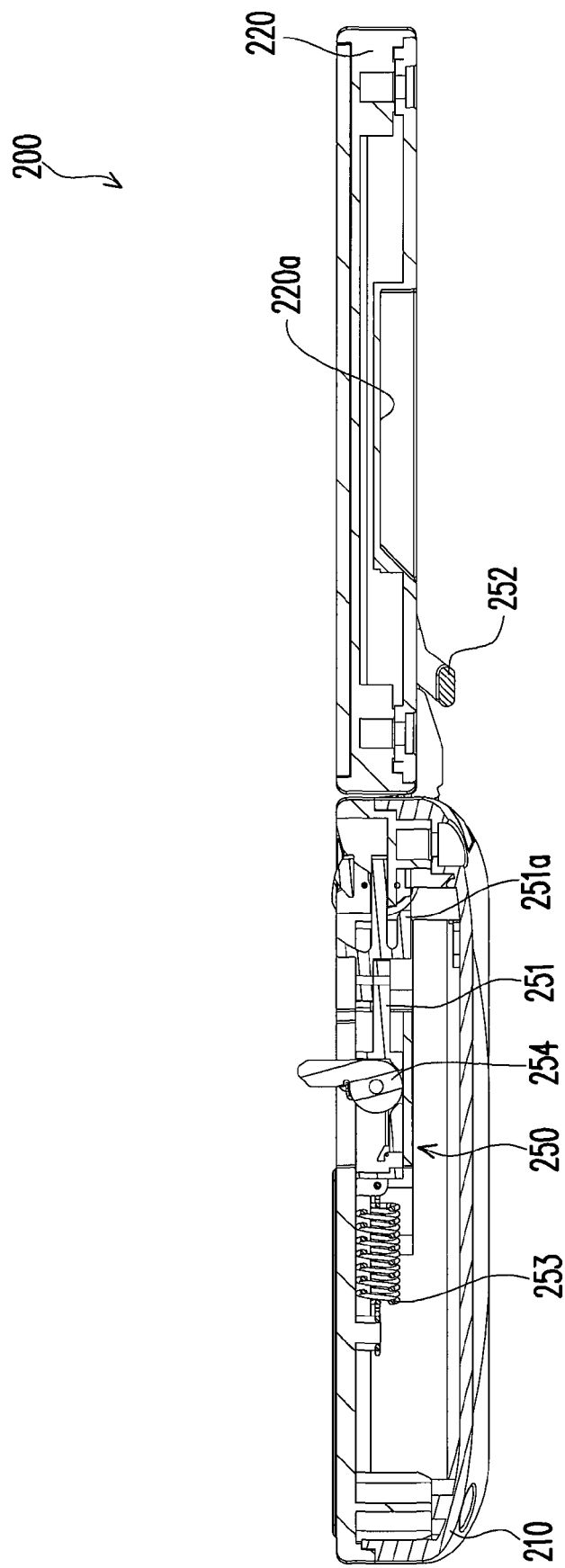
FIGS. 4A to 4F show a process of closing the portable electronic device in FIG. 2A.
Figure 4B:
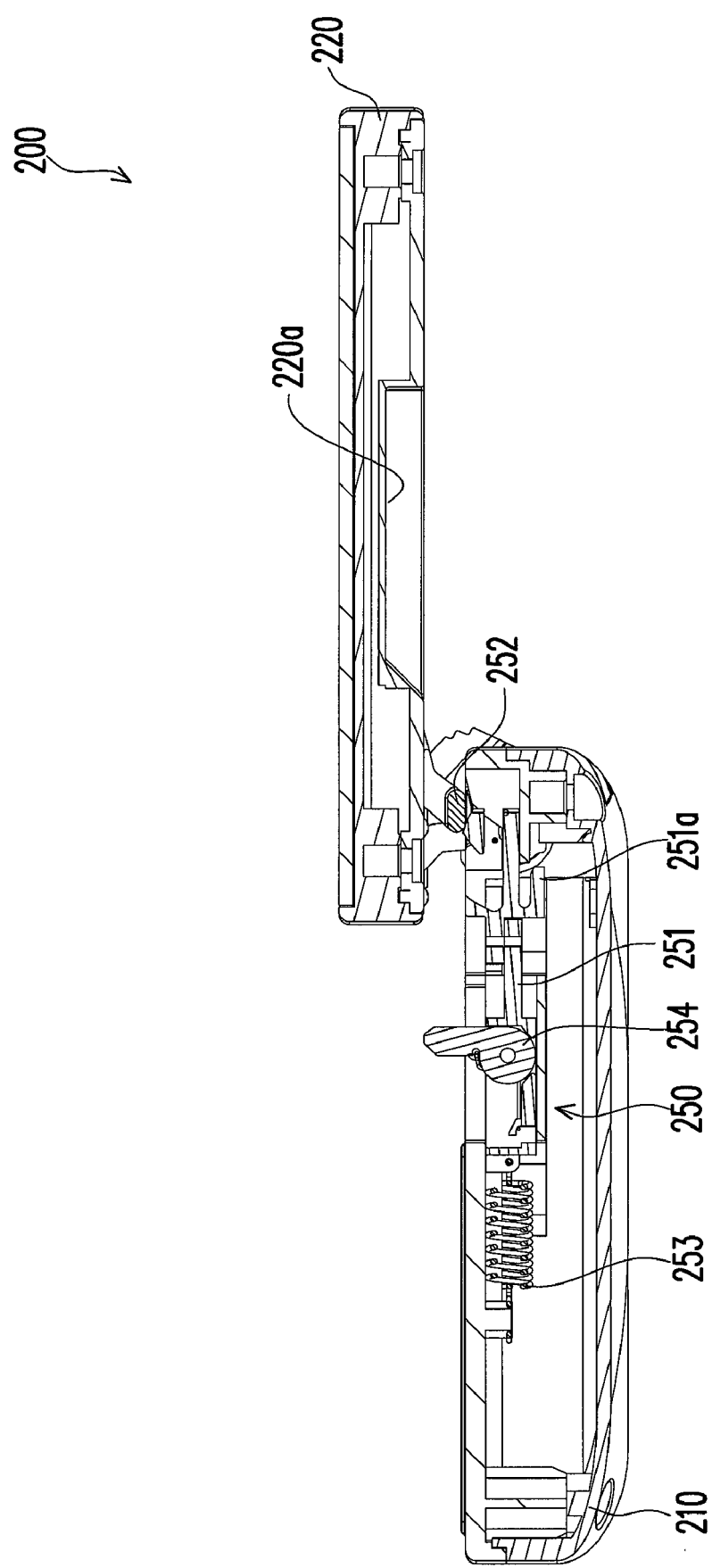

FIGS. 4A to 4F show a process of closing the portable electronic device in FIG. 2A. Referring to FIGS. 4A and 4B, the second body 220 is moved from a position in FIG. 4A to a position in FIG. 4B with respect to the first body 210 through the moving mechanism 230. At the same time, the guide block 252 just contacts the guide rail 251a.

Figure 4C:
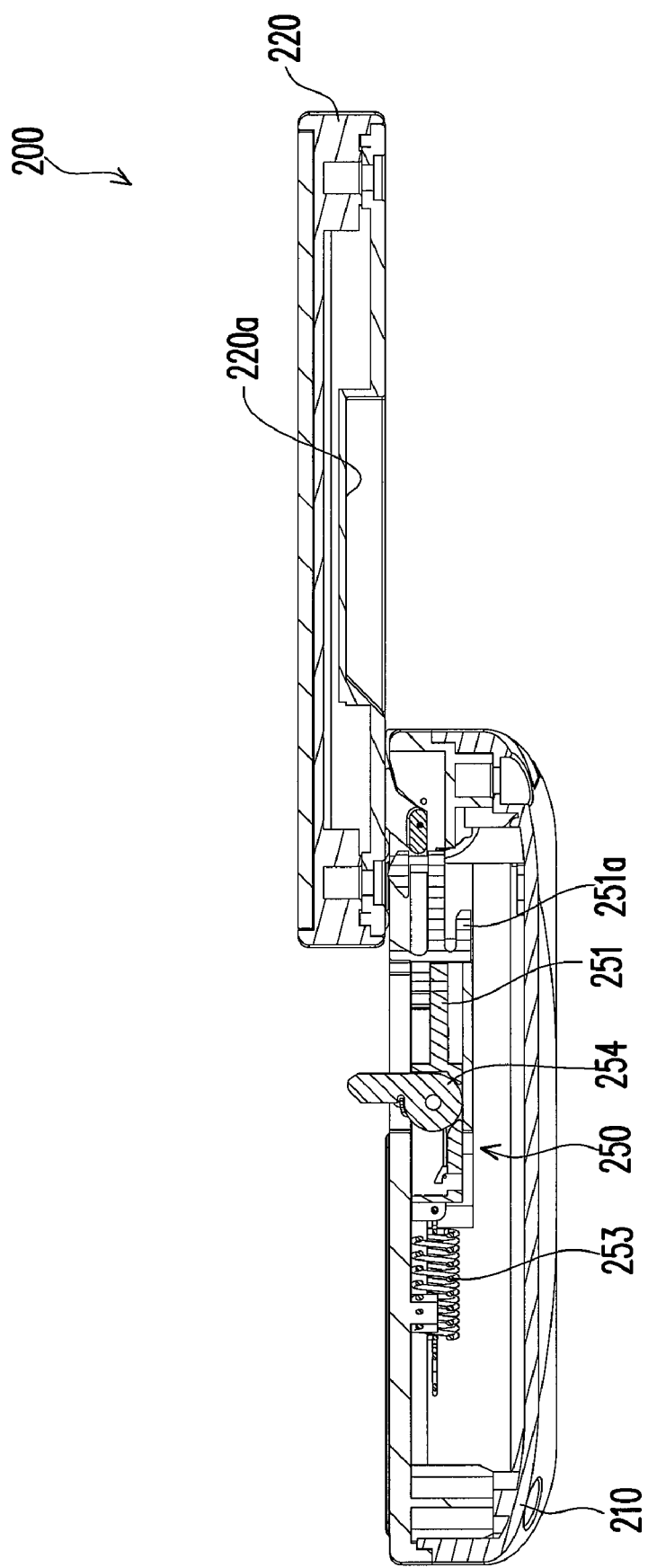

Referring to FIGS. 4B and 4C, the second body 220 is moved from the position in FIG. 4B to a position in FIG. 4C with respect to the first body 210 through the moving mechanism 230. More particularly, when the guide block 252 in FIG. 4B falls continuously, the guide block 252 pushes the guide rail 251a to move towards, the left side, and the guide rail 251a drives the braking base 251 to compress the first elastic member 253. At the same time, the guide block 252 just enters the horizontal part of the guide rail 251a.

Figure 4D:
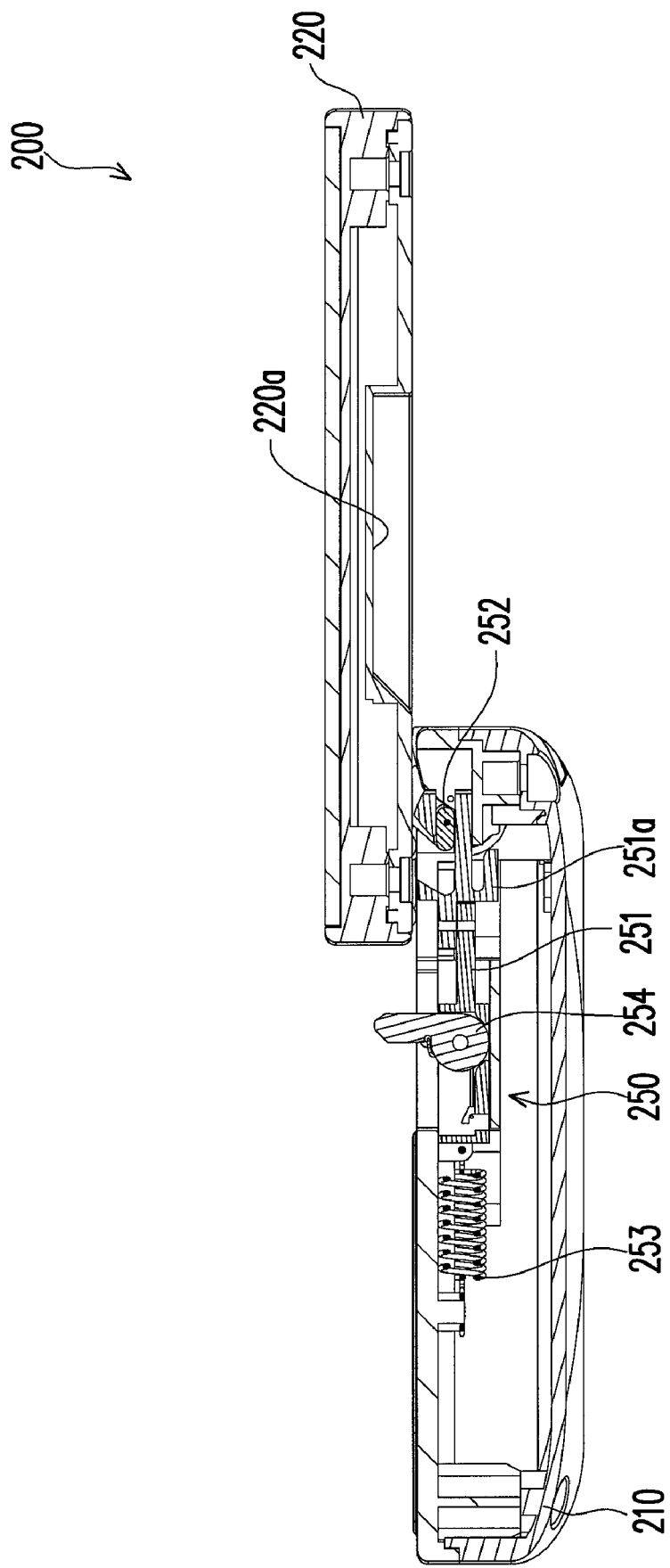

Referring to FIGS. 4C and 4D, the second body 220 is moved from the position in FIG. 4C to a position in FIG. 4D with respect to the first body 210 through the sliding mechanism 240. At this time, the guide block 252 has entered the guide rail 251a. Further, the first elastic member 253 resets the braking base 251 and the guide rail 251a.

Figure 4E:
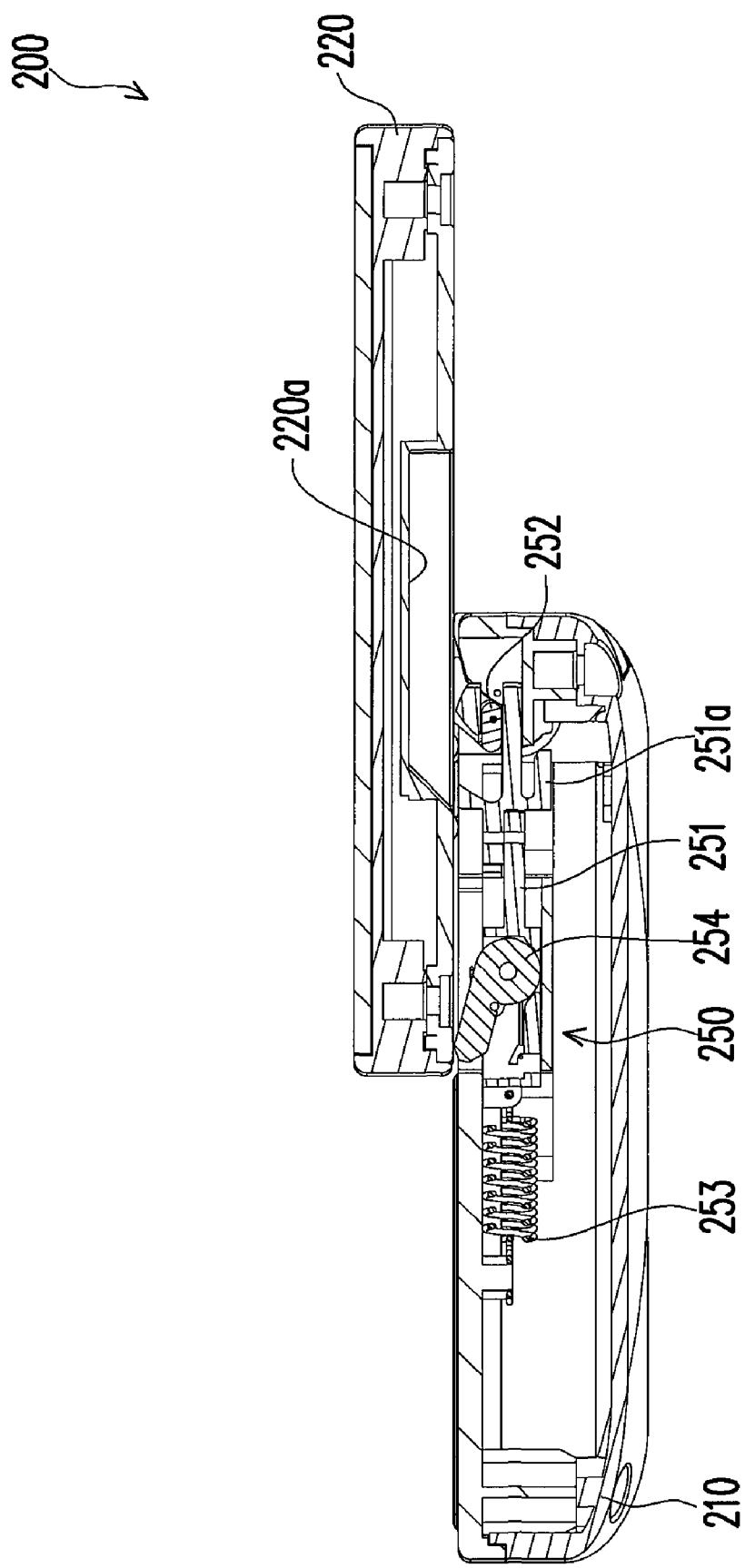

Referring to FIGS. 4D and 4E, the second body 220 is moved from the position in FIG. 4D to a position in FIG. 4E with respect to the first body 210 through the sliding mechanism 240. At this time, in order to make the second body 220 slide above the first body 210, the trigger 254 is forced to rotate and hide into the braking base 251.

Figure 4F:
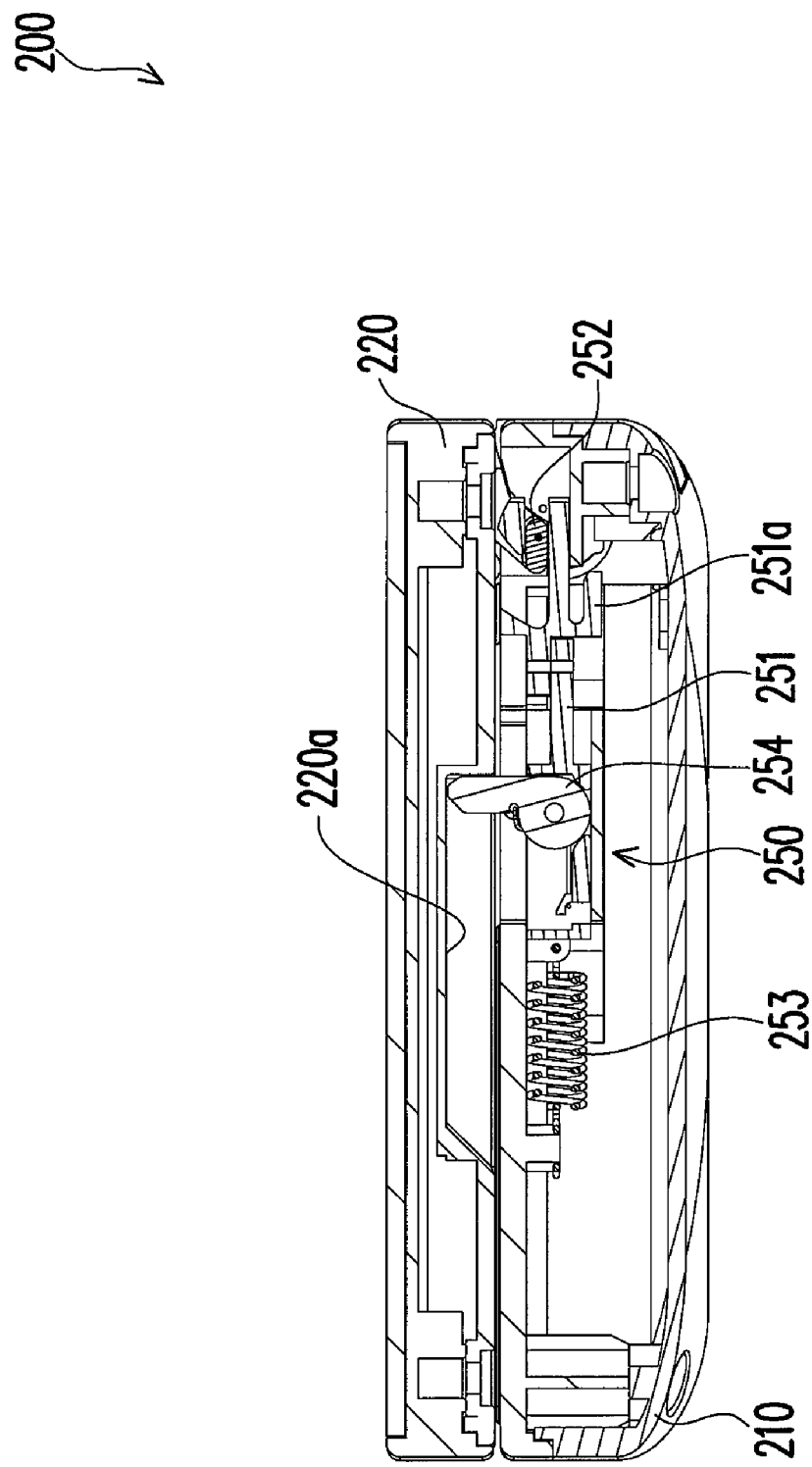

Referring to FIGS. 4E and 4F, the second body 220 is moved from the position in FIG. 4E to a position in FIG. 4F with respect to the first body 210 through the sliding mechanism 240. At this time, the second elastic member 255 resets the trigger 254 with respect to the braking base 251 to a position capable of being pushed by the groove 220a of the second body 220 again.

In view of the above, the present application stacks or spreads the two bodies through the sliding mechanism and the moving mechanism, so as to improve the area utilization rate of the first body. Therefore, the present application allows the portable electronic device to have large area utilization rate with a small volume, which is facilitate to the improvement of the design flexibility.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
   a first body;
   a second body; and
   a moving mechanism, disposed between the first body and the second body, such that the second body is movable between a first position and a second position with respect to the first body, and in the first position, the second body is stacked on the first body,
   wherein, in the second position, top surfaces of the first body and the second body are substantially coplanar, and the second body is laterally close to the first body and is not stacked on the first body,
   wherein the moving mechanism comprises:
      at least one rotating arm pivoted to the first body and the second body respectively; and
      at least one parallel arm pivoted to the first body and the second body respectively, wherein a distance between rotation axes of the rotating aim and the parallel arm pivoted to the second body is substantially equal to a distance between rotation axes of the rotating arm and the parallel arm pivoted to the first body.

2. The portable electronic device according to claim 1, wherein during the movement of the second body between the first position and the second position, the second body is kept substantially horizontal with respect to the first body.

3. The portable electronic device according to claim 1, wherein the moving mechanism comprises:
   a fixing means, disposed between the first body and the second body.

4. The portable electronic device according to claim 3, wherein the fixing means comprises:
   an auxiliary arm, with one end fixed to the rotating arm;
   a first magnet, fixed on the other end of the auxiliary arm; and
   a second magnet, fixed on the first body, for working together with the first magnet to generate a magnetic force to limit the rotation of the auxiliary with respect to the first body.

5. The portable electronic device according to claim 1, further comprising:
   a sliding mechanism, disposed between the moving mechanism and the second body, such that the second body is moveable between a first sliding position and a second sliding position with respect to the moving mechanism.

6. The portable electronic device according to claim 5, wherein the sliding mechanism comprises:
   at least one slide rail, fixed on the second body; and
   a base, connected to the moving mechanism, and comprising at least one sliding block coupled to the slide rail for sliding along the slide rail.

7. The portable electronic device according to claim 1, further comprising:
   a braking mechanism, disposed on the first body, for changing the moving mechanism from a disabled state to an enabled state corresponding to the movement of the second body with respect to the first body.

8. The portable electronic device according to claim 7, wherein the braking mechanism comprises:

a braking base, slidably disposed in the first body, and comprising a guide rail;

a guide block, fixed to the second body, and moveable in the guide rail;

a first elastic member, disposed between the braking base and the first body; and a trigger, pivoted at the braking base, wherein the second body is capable of pushing the trigger to move the braking base, such that the guide block is moved to the moving mechanism with respect to the guide rail and the moving mechanism is changed from the disabled state into the enabled state.

9. The portable electronic device according to claim 8, wherein the braking mechanism further comprises:

a second elastic member, disposed between the trigger and the braking base, for resetting the trigger with respect to the braking base.

10. The portable electronic device according to claim 8, wherein the second body comprises a groove, and is capable of pushing the trigger through an inner wall of the groove.

* * * * *